June 24, 1952  J. A. NICHOLSON  2,601,449
CHUTE SUPPORTING MECHANISM
Filed Dec. 22, 1949  3 Sheets-Sheet 1
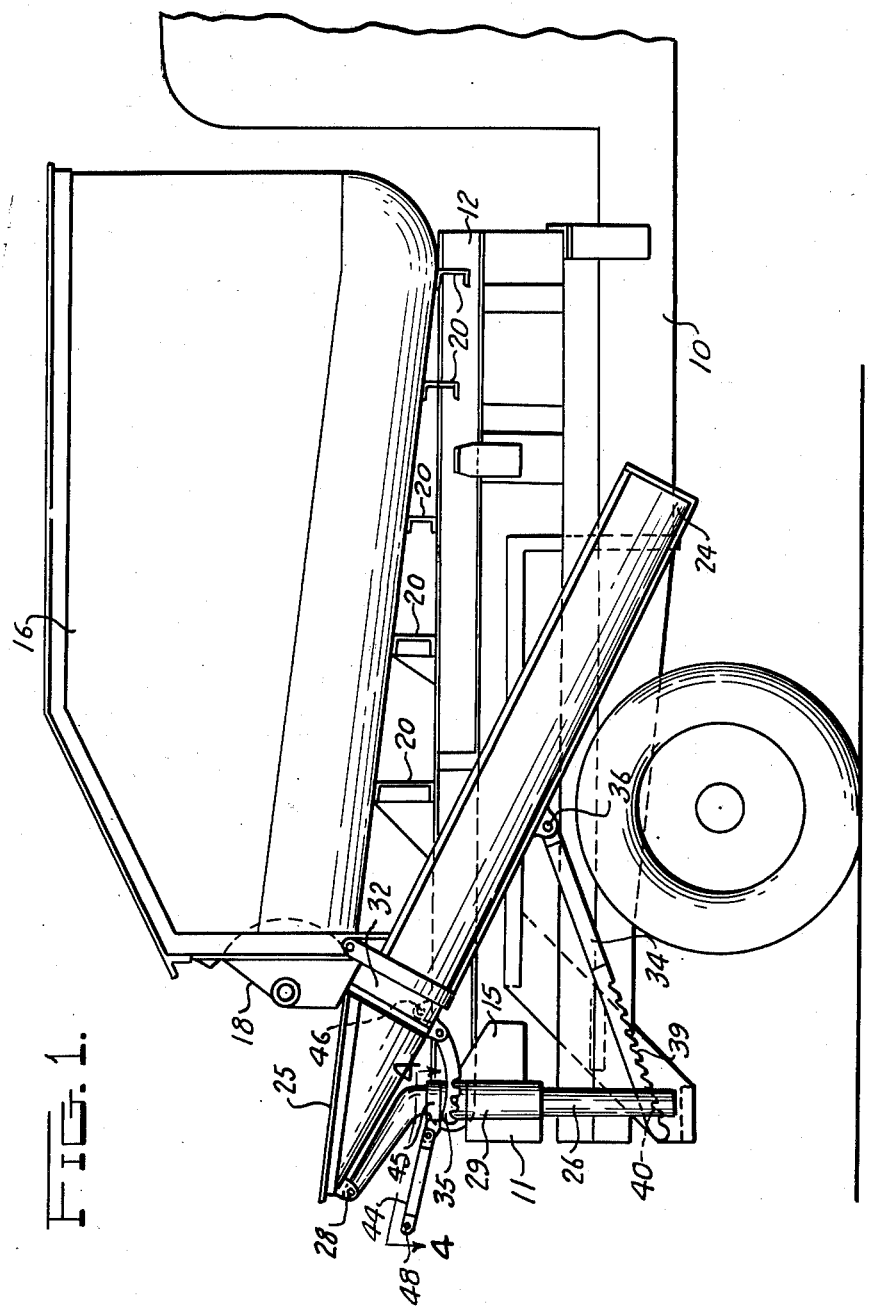
INVENTOR.
James A. Nicholson
BY
ATTORNEYS

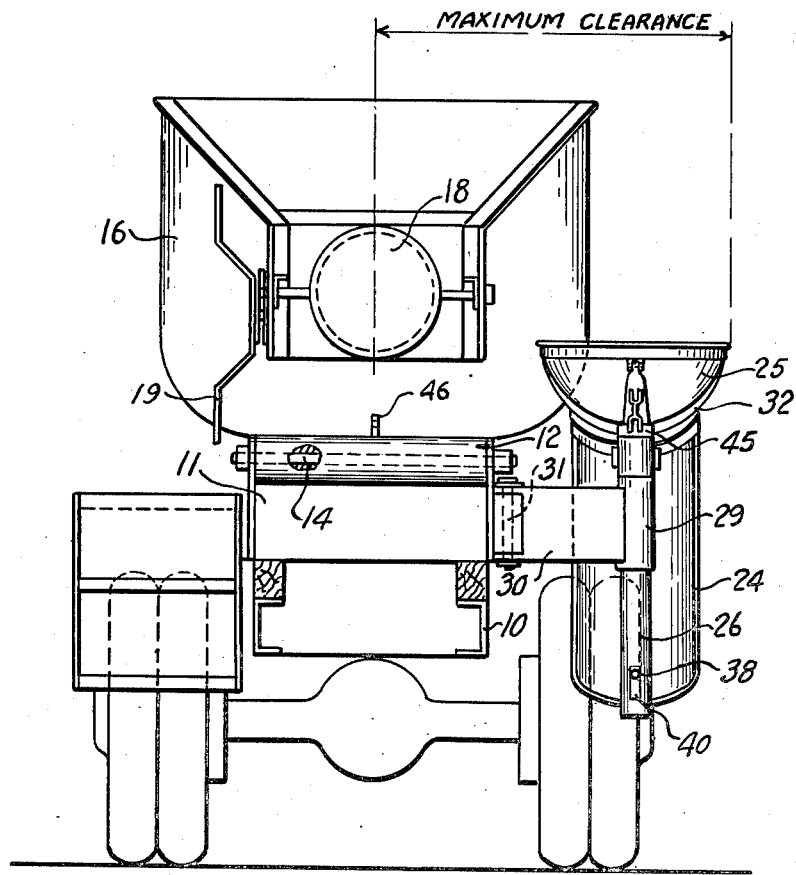

June 24, 1952      J. A. NICHOLSON      2,601,449
CHUTE SUPPORTING MECHANISM
Filed Dec. 22, 1949      3 Sheets-Sheet 3
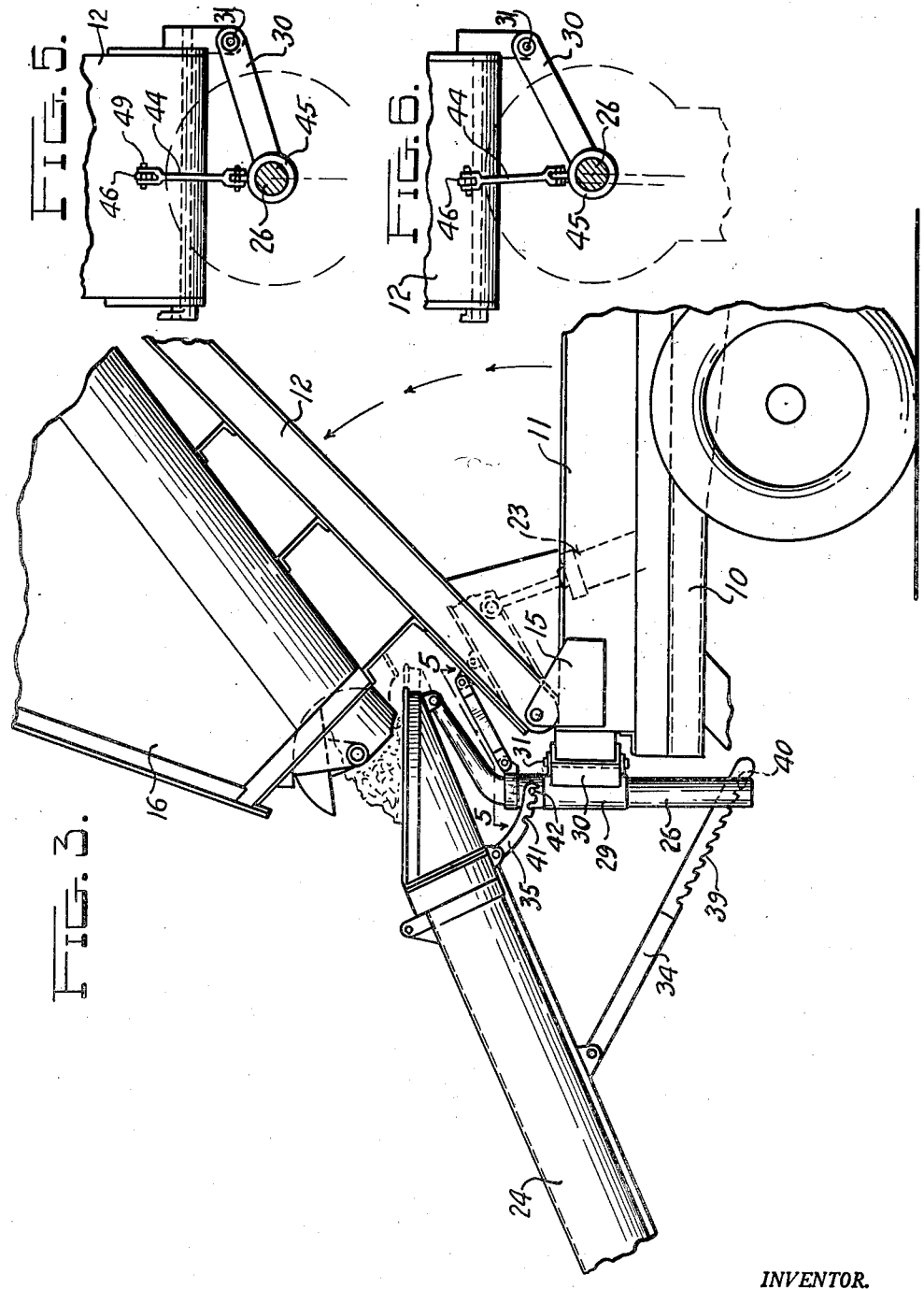
INVENTOR.
James A. Nicholson
BY
ATTORNEYS Patented June 24, 1952

2,601,449

UNITED STATES PATENT OFFICE 2,601,449

CHUTE SUPPORTING MECHANISM

James A. Nicholson, Toledo, Ohio

Application December 22, 1949, Serial No. 134,437

6 Claims. (Cl. 298—7)

This invention relates to a chute supporting mechanism, and relates particularly to a mechanism for supporting and adjustably positioning chutes relative to a movable discharge gate, so that the chute pan is automatically maintained in receiving position below the discharge gate at all times.

Chutes of various types are employed upon concrete dump trucks to assist in directing the concrete to the most advantageous point of use. One of the problems arising in connection with such chutes is the maintenance of the chute pan immediately below the discharge gate during the discharge of the concrete from the container. As the container is raised for discharge purposes, the gate moves in an arcuate direction upwardly and rearwardly when the frame carrying the container is pivoted at a point rearwardly from the discharge gate. When this pivot point is ahead of the discharge gate, the gate moves downwardly and forwardly. Chute pans have heretofore been made of such large diameter that the concrete is directed into the pan through the gate in both the minimum and maximum positions of the discharge. This attempted solution to the problem, however, is not satisfactory because the chute pan must necessarily be so large that it cannot be conveniently carried at the side of the truck without exceeding the maximum legal clearance, as hereinafter discussed.

It is an object of this invention, therefore, to provide a chute supporting mechanism which, in conjunction with a pivotally mounted container having a discharge gate, includes means for automatically maintaining a relative constant vertical relationship between the discharge gate and the chute pan while the container is raised and lowered.

Another object of this invention is to provide a chute supporting and adjusting mechanism capable of maintaining a chute pan in receiving relationship with a moving discharge gate, but which permits the chute to be swung out of the way when it is not required for directing a discharge.

Still another object of this invention is to provide a chute supporting mechanism for trucks and the like which is automatically adjustable to maintain the chute pan in receiving position relative to the discharge gate, said pan being relatively small in size.

A further object of this invention is to provide a simple, inexpensive chute supporting and adjusting mechanism which may be applied to a wide variety of sizes and shapes of dump trucks without requiring any major alterations in either the trucks or the chute mechanism.

Other objects and advantages of the present invention will become apparent to those skilled in the art from the following detailed description thereof when read in conjunction with the accompanying drawings, in which:

Fig. 1 is a side elevation of a dump truck carrying a chute supporting mechanism comprising the present invention, Fig. 2 is an end view of the rear of the truck shown in Fig. 1, Fig. 3 is a fragmentary view of the rear end of the dump truck shown in Fig. 1 in discharge position, Fig. 4 is a fragmentary, diagrammatic sectional view taken on line 4—4 of Fig. 1, Fig. 5 is a diagrammatic sectional view taken on line 5—5 of Fig. 3, and Fig. 6 is a view similar to Fig. 5 with the dump body at its maximum elevation.

In the accompanying drawings, the present invention is illustrated in connection with a dump truck of the type employed for the transporting and delivery of concrete. This truck comprises a chassis 10 upon which is positioned a sill 11. An upper frame 12 is pivoted about a shaft 14 which is supported in plates 15—15 attached to the sill 11.

A container 16 having a discharge gate 18 which is rotated into and out of discharging positions by the handle 19, is positioned upon the upper frame 12 by means of horizontal braces 20. In operating the gate 18, the operator turns the handle 19 after the container 16 is raised to initial discharge position by a suitable hydraulic mechanism, such as is shown in dotted lines in Fig. 3 at 23.

A chute 24 extends from a pan 25 which is pivotally supported upon a post 26 at the point 28. The post 26 is rotatably mounted in a hollow boss 29 formed upon one end of a hinge 30, which is in turn pivotally supported by a pintle 31 attached to the sill 11.

The chute 24 may be angularly adjusted with respect to the pan 25 by means of an adjustable joint 32, and means for separately adjusting the delivery angle of the chute and the pan are provided by adjustment rods 34 and 35, respectively. Rod 34 is pivotally attached at 36 to the chute 24 and extends through a slot 38 in the bottom of the post 26 wherein rack teeth 39 formed on the rod 34 engage complementary teeth 40 formed in the slot 38. A series of notches 41 are cut in the rod 35 and engage a catch pin 42 fixedly positioned in the post 26.

A reach link 44 is pivotally connected to a collar 45 freely rotatably mounted about the post 26. An eye 46 is located upon the upper frame 12 so that a yoke 48 in the free end of the reach link 44 may be attached to the eye 46 by a pin 49. When not in use, the reach link 44 is left free, as shown particularly in Figs. 1 and 4.

In the transporting position shown in Figs. 1 and 2, and diagrammatically in Fig. 4, the container 16 is positioned horizontally with the discharge gate 18 closed. The chute 24 is swung alongside the truck body by swinging the hinge 30 outwardly. In this position, the maximum clearance required for the truck is determined by the width of the pan 25, as is clearly shown in Fig. 2.

After the truck has reached its destination, the chute 24 is removed from its transporting position to operative position in which pan 25 is beneath the discharge gate. When in this position the chute may be swung outwardly, to either side, or to the rear (as shown in Fig. 3), or to some intermediate position. The reach link 44 is first attached to the eye 46 by the pin 49 and the angular adjustments of the chute 24 and the pan 25 are then made. The chute 24 may be moved forwardly or downwardly, pivoting about the adjustable joint 32, by lengthening or shortening the rod 34 by means of rack teeth 49 engaging complementary teeth 40 in the post 26. The pan 25 may be moved upwardly or downwardly about the pivot point 28 by positioning the catch pin 42 in a particular notch 41. The discharge position may thus be altered by the operator within wide limits.

When the container 16 is in the discharging position, the hinge leaf 30 is approximately parallel to the axle 14, as shown in Fig. 4 in dotted lines. As the container is raised to mid position, as shown in Figs. 3 and 5, the discharge gate 18 is opened by the operator turning the handle 19, so that the container contents flow through the discharge gate into the pan 25. As the container 16 is raised, the gate 18 describes an arcuate path upwardly and rearwardly with respect to the truck chassis 10. As the upper frame 12 moves upwardly, the eye 46 being carried by the moving frame also moves in an arcuate direction rearwardly and upwardly. Since the link 44 is pivotally attached to the collar 45 at a point offcenter from the pivot point of the frame 12, this arcuate movement of the eye 46 causes the reach link 44 to bear against the collar 45 and initiate rearward movement of the pan 25. In order to maintain the pan 25 in receiving position below the discharge gate 18, the eye 46 is located upon the upper frame 12 at a distance ahead of the shaft 14 so that the rearward movement imparted to the pan 25 through the reach link 44 and collar 45 will approximate the rearward movement of the discharge gate 18.

Since the post 26 which supports the pan 25 swings upon the end of the hinge leaf 30, the movement of the pan 25 is also arcuate, moving rearwardly and to one side of the truck body. Thus, when the container 16 is raised to its maximum position, as illustrated in Fig. 6, the pan 25 is approximately ½ inch offcenter in a direction opposite that when in the original position shown in Fig. 4. By thus positioning the pan 25 to one side of the center of the truck in its original position, the lateral movement of the pan is divided between the maximum and minimum positions so that at no time is the pan offcenter more than ½ of its total lateral movement. In actual practice, this lateral movement is so small as to be of almost negligible importance when designing the size of the pan 25.

Numerous variations and modifications may be made in the particular embodiment of the present invention shown in the drawings. For example, angular adjustment of the pan and chute may be achieved by any one of several well known mechanisms, or may be omitted altogether, although such omission would result in an inferior device. The particular type of post employed, as well as the particular type of hinge support for the post, may be widely altered. The post may be attached to the chute pan at the upper edge, as shown, or in numerous other suitable positions obvious to those skilled in the art. There also may be considerable variation in the type of link employed, as long as the link is rigid. The manner of attaching the link both to the post and to the upper frame may be considerably varied, and the link may be attached directly to the pan, if desired, rather than indirectly as shown.

From the above detailed description, it will be apparent that one of the advantages of the present invention lies in the use of a small sized pan whereby the maximum clearance required for the truck is considerably reduced. Another advantage resides in the automatic adjustment of the chute pan to maintain the same in receiving relationship with respect to the discharge gate, so that spilling of concrete or other materials does not occur. Still another advantage of this invention is its extreme simplicity and low cost coupled with its adaptability for use with numerous types of dump trucks now on the market. By regulating the distance between the eye 46 and the pivot member 14, the rearward movement of the pan 25 may be so regulated as to be in unison with the rear movement of the discharge gate 18. Since the chute is entirely out of the way when it is in transporting position at the side of the truck and can remain there without interfering with truck discharge, the body can readily be used to transport materials which do not require chuting. In prior devices, the chute, or some part of its attaching mechanism, has usually been so constructed as to hinder the free flow of material when the chute was not used.

What I claim is:

1. In a truck for transporting pourable materials having a chassis, an upper frame pivotally connected to the chassis, means for raising and lowering said upper frame about its pivot, a container located upon the upper frame, a discharge gate in the container above and spaced longitudinally of the truck from said frame pivot, and a chute having a pan for receiving material from the discharge gate, the improvement comprising a chute mounting mechanism including a hinge member pivotally supported upon the truck chassis rearwardly of the frame pivot, means for supporting the chute pan on said hinge member to permit the pan to be swung horizontally into position below the gate to receive the discharge therefrom when the container is in the initial discharge position, and means interconnecting the chute pan with the upper pivoted frame at a point forward of its pivot so that the chute pan and the discharge gate move backwardly and forwardly in unison when the upper frame is moved during discharge.

2. In a truck for transporting pourable materials having a chassis, an upper frame pivotally connected to the chassis, means for raising and lowering said upper frame about its pivot, a container located upon the upper frame, a discharge gate in the container, and a chute having a pan for receiving material from the discharge gate, the improvement comprising a chute mounting mechanism including a hinge member pivotally supported upon the truck chassis for horizontal swinging movements, means for supporting the chute pan upon the free end of said hinge member whereby the pan may be swung into position below the gate to receive the discharge therefrom when the container is in the initial discharge position, and a link pivotally connected at one end to said pan and at the other end to said upper frame at a point ahead of the frame pivot so as to cause said pan and frame to move forwardly and rearwardly together and maintain the chute pan in receiving relationship to the discharge gate during the entire period of discharge.

3. In a truck for transporting pourable materials having a chassis, an upper frame pivotally connected to the chassis, means for raising and lowering said upper frame about its pivot, a container located upon the upper frame, a discharge gate in the container above and spaced longitudinally of the truck from said frame pivot, and a chute having a pan for receiving material from the discharge gate, the improvement comprising a chute mounting mechanism including a hinge member pivotally supported about a vertical axis upon the truck chassis, means for rotatably supporting the chute pan upon the free end of said hinge member in such a manner that the pan may be swung into position below the gate to receive the discharge therefrom when the container is in the initial discharge position, and means interconnecting the chute pan with the upper pivoted frame at a point sufficiently removed from the frame pivot so that the chute pan and the discharge gate move backwardly and forwardly in unison upon pivotal movements of the frame.

4. In a truck for transporting pourable materials having a chassis, an upper frame pivotally connected to the chassis, means for raising and lowering said upper frame about its pivot, a container located upon the upper frame, a discharge gate in the container above and forwardly of the frame pivot when the frame is in transporting position, and a chute having a pan for receiving material from the discharge gate, the improvement comprising a chute mounting mechanism including a hinge member pivotally supported upon the truck chassis for horizontal swinging movements, means for supporting the chute pan upon the free end of said hinge member to be swung therewith to place the pan into position below the gate to receive the discharge therefrom when the container is in initial discharge position, a link attached at one end to the pan supporting means by a ring rotatably mounted thereon, and a catch upon the upper frame attached to the other end of the link and located a distance ahead of the frame pivot so that during a raising and lowering of the upper frame the chute pan moves forwardly and backwardly in unison with the discharge gate.

5. In a truck for transporting pourable materials having a stationary chassis, an upper frame pivotally connected to the chassis, means for raising and lowering said upper frame about its pivot, a container mounted upon the frame, a discharge gate in the container located ahead of the pivot when the frame is in lowered position, and a chute with a pan for receiving material from the discharge gate, the improvement comprising a chute mounting mechanism including a horizontally swingable hinge member supported upon the rear portion of the chassis, a hollow boss formed upon the free end of the hinge member, a post positioned in the boss and connected to the pan, and means interconnecting the chute pan with the upper pivoted frame at a point forwardly of its pivot so that the pan and the discharge gate move backwardly and forwardly in unison upon tilting movements of the frame.

6. In a truck for transporting pourable materials having a stationary chassis, an upper frame pivotally connected to the chassis, means for raising and lowering said upper frame about its pivot, a container mounted upon the frame, a discharge gate in the container located ahead of the pivot, and a chute with a pan for receiving material from a discharge gate, the improvement comprising a chute mounting mechanism including a hinge member pivotally supported upon the rear portion of the chassis for horizontal swinging movements, a hollow boss formed upon the free end of the hinge member, a post positioned in the boss and connected to the pan, a catch located upon the upper frame ahead of the pivot and approximately midway between the sides thereof, an anchor ring rotatable on the post, and a link connected at one end to said ring and at the other end to the catch upon the upper frame so as to maintain vertical alignment between the discharge gate and the pan during movement of the upper frame during discharge.

JAMES A. NICHOLSON.

REFERENCES CITED

The following references are of record in the file of this patent:

UNITED STATES PATENTS

| Number | Name | Date |
|---|---|---|
| 1,890,982 | Foster et al. | Dec. 13, 1932 |
| 2,419,824 | Davis | Apr. 29, 1947 |
| 2,488,292 | Hilkemeier | Nov. 15, 1949 |
| 2,542,799 | Day | Feb. 20, 1951 |
| 2,552,850 | Gray | May 15, 1951 |

FOREIGN PATENTS

| Number | Country | Date |
|---|---|---|
| 400,342 | Great Britain | June 22, 1932 |
| 427,033 | Great Britain | Apr. 15, 1935 |